United States Patent
Cripsey

(10) Patent No.: US 9,169,878 B2
(45) Date of Patent: Oct. 27, 2015

(54) TORQUE TRANSMITTING ASSEMBLY AND METHOD OF PRODUCING

(71) Applicant: Metal Forming & Coining Corporation, Maumee, OH (US)

(72) Inventor: Timothy J. Cripsey, Rochester, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 126 days.

(21) Appl. No.: 13/793,349

(22) Filed: Mar. 11, 2013

(65) Prior Publication Data

US 2013/0264165 A1 Oct. 10, 2013

Related U.S. Application Data

(60) Provisional application No. 61/620,013, filed on Apr. 4, 2012.

(51) Int. Cl.
*F16D 11/00* (2006.01)
*F16H 57/08* (2006.01)
*F16H 57/00* (2012.01)
*B23K 26/28* (2014.01)
*B23K 31/02* (2006.01)
*B23K 11/26* (2006.01)

(52) U.S. Cl.
CPC ............... *F16D 11/00* (2013.01); *B23K 11/26* (2013.01); *B23K 26/28* (2013.01); *B23K 31/02* (2013.01); *F16H 57/00* (2013.01); *F16H 57/082* (2013.01); *B23K 2201/006* (2013.01); *B23K 2201/008* (2013.01); *F16H 2057/087* (2013.01); *Y10T 29/49465* (2015.01)

(58) Field of Classification Search
CPC .............. F16H 57/00; F16H 2057/087; B23K 2201/008; F16D 11/00
See application file for complete search history.

(56) References Cited

U.S. PATENT DOCUMENTS

| 3,842,481 | A | 10/1974 | Laing |
| 4,043,021 | A | 8/1977 | Mosbacher et al. |
| 5,470,286 | A | 11/1995 | Fan |

(Continued)

FOREIGN PATENT DOCUMENTS

| CN | 1735761 A | 2/2006 |
| DE | 19544197 A1 | 6/1997 |
| WO | 2004065822 A2 | 8/2004 |
| WO | WO 2010149472 A1 * | 12/2010 |

*Primary Examiner* — Derek D Knight
*Assistant Examiner* — Timothy M Hannon
(74) *Attorney, Agent, or Firm* — Fraser Clemens Martin & Miller LLC; James D. Miller

(57) ABSTRACT

A torque transmitting assembly is provided. The torque transmitting assembly includes a generally cup shaped outer shell having a closed end and an open end. The closed end has at least one raised portion formed therein. The outer shell includes an outwardly extending lip surrounding the open end of the outer shell. The open end of the outer shell is adapted to be operatively engaged with a first rotating member. A generally disk shaped inner member has a central aperture and a central axis. The inner member includes at least one tab extending axially outwardly therefrom and engages the raised portion of the outer shell to facilitate a transfer of rotation between the outer shell and the inner member. The central aperture is adapted to be operatively engaged with a second rotating member. The inner member is received inside said outer shell.

20 Claims, 4 Drawing Sheets

(56) References Cited

U.S. PATENT DOCUMENTS

| | | | |
|---|---|---|---|
| 6,434,827 B1* | 8/2002 | Trent et al. | 29/893.1 |
| 2008/0032850 A1* | 2/2008 | Ishizuka | 475/331 |
| 2008/0086857 A1 | 4/2008 | Stevenson | |
| 2010/0304918 A1* | 12/2010 | Burgman et al. | 475/331 |

* cited by examiner

TORQUE TRANSMITTING ASSEMBLY AND METHOD OF PRODUCING

RELATED APPLICATIONS

This application claims the benefit of U.S. Provisional Application No. 61/620,013, filed Apr. 4, 2012, the disclosure of which is incorporated herein by reference.

BACKGROUND

A pinion carrier is a support structure that locates pinion (or planet) gears in a planetary gear set and transmits torque to other components within a vehicle transmission. A drive shell or planet carrier is a tubular metal component that carries torque from the pinion carrier to another component axially displaced from the pinion carrier in the transmission. The drive shell also revolves around the central axis of the pinion carrier and supports the pinion gears.

Some known methods for producing a pinion carrier include progressively stamping a cup and an end plate and welding the two pieces together; producing powdered metal components which are brazed or bolted together; or cold forming a cup which is welded to a stamped plate.

Current methods for producing a drive shell include deep drawing sheet metal to a tubular shape and forming splines on an inner wall thereof, and cutting a thin walled tube to length and forming splines on an inner surface thereof.

Known methods of producing a combined carrier and drive shell include progressively stamping cups from metal stock having different diameters which are then welded together facing each other. The inner cup is used as the pinion carrier, and the outer cup is used as the drive shell.

In respect of the practices listed above, several problems are experienced in forming the pinion carrier portion of the assembly. Due to the brittle nature of powdered metal parts, the cross-section of the portion of the pinion carrier that separates the retaining faces must be structurally large. During the manufacturing process, a grain density variation is created at the bases of the portion of the pinion carrier that separate retaining faces where it meets much thinner retaining faces. This density variation, along with the concurrent thickness change in the same area, results in a stress riser that frequently causes fracture and failure of the component. To counteract this, the legs and retaining faces must be made thicker than would be needed when produced from wrought material in order for the part to survive its application. This results in increased weight and space consumption, both of which are expensive and undesirable in an automatic transmission environment.

For stamped parts, the production method provides more flexibility than powdered metal and generally reduces space consumption by comparison. However, there is no ability to significantly change the material thickness for any component of the assembly. Therefore, the entire part will be the same thickness as that portion of the assembly needing the most strength. The result is excess mass and space consumption, although it represents a large improvement in these aspects as compared to parts produced from powdered metal. The biggest weakness of stamped parts is the lack of stiffness. Under heavy loading, the stamped parts frequently deflect to the point that the gears may become misaligned causing undesirable noise and wear.

For cold formed parts, improved stiffness is experienced over stampings, and the process can create various material thicknesses in different locations on the components. Therefore, it can minimize overall mass while concentrating material in critical areas. Furthermore, tooling is comparable to that for powdered metal and far less expensive and complex than that required for stamping. The level of detail achievable in cold forming is good enough that many applications require no machining other than creating the pinion shaft holes after forming. However, cold forming is somewhat limited in its ability to create long extrusions cost-effectively.

It would be desirable to produce a torque transmitting assembly wherein production efficiency is maximized and weight and production costs are minimized.

SUMMARY OF THE INVENTION

According to the invention there is provided a torque transmitting assembly including a generally cup shaped outer shell having a closed end and an open end. The closed end has at least one raised portion formed therein. The outer shell includes an outwardly extending lip surrounding the open end of the outer shell. The open end of the outer shell is adapted to be operatively engaged with a first rotating member. A generally disk shaped inner member has a central aperture and a central axis. The inner member includes at least one tab extending axially outwardly therefrom and engages the raised portion of the outer shell to facilitate a transfer of rotation between the outer shell and the inner member. The central aperture is adapted to be operatively engaged with a second rotating member. The inner member is received inside said outer shell.

According to the invention there is also provided a torque transmitting assembly including a drive shell having a closed end and an open end. The closed end has a plurality of raised portions formed therein. The drive shell includes an outwardly extending lip surrounding the open end of the drive shell. The open end of the drive shell is adapted to be operatively engaged with a first rotating member. A pinion carrier has a central aperture and a central axis. The pinion carrier includes a plurality of tabs extending axially outwardly therefrom and engages the raised portions of the drive shell to facilitate a transfer of rotation between the drive shell and the pinion carrier. The central aperture is adapted to be operatively engaged with a second rotating member.

According to the invention there is also provided a method of producing a pinion carrier and drive shell assembly. The method includes the steps of providing a drive shell having a closed end and an open end, the closed end has a plurality of raised portions formed therein, the drive shell includes an outwardly extending lip surrounding the open end of the drive shell, the open end of the drive shell is adapted to be operatively engaged with a first rotating member, providing a pinion carrier having a central aperture and a central axis, the pinion carrier includes a plurality of tabs extending axially outwardly therefrom, the central aperture is adapted to be operatively engaged with a second rotating member, inserting the pinion carrier into the drive shell and attaching the tabs of the pinion carrier to the raised portions of the drive shell to facilitate a transfer of rotation between the drive shell and the pinion carrier.

Various objects and advantages of this invention will become apparent to those skilled in the art from the following detailed description of the invention, when read in light of the accompanying drawings.

BRIEF DESCRIPTION OF THE DRAWINGS

FIG. 4b is an enlarged fragmentary view of the projections of FIG. 4a.

DESCRIPTION OF INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose a torque transmitting assembly, combining a drive shell and a pinion carrier. Generally, the pinion carrier is configured to seat against raised portions of the drive shell. The term "drive shell", as used herein, is defined to mean any cup-shaped structure used to transmit torque to other components. The term "pinion carrier", as used herein, is defined to mean any structure configured to locate pinion gears in a planetary gear set and transmit torque to other components.

Figure 1:
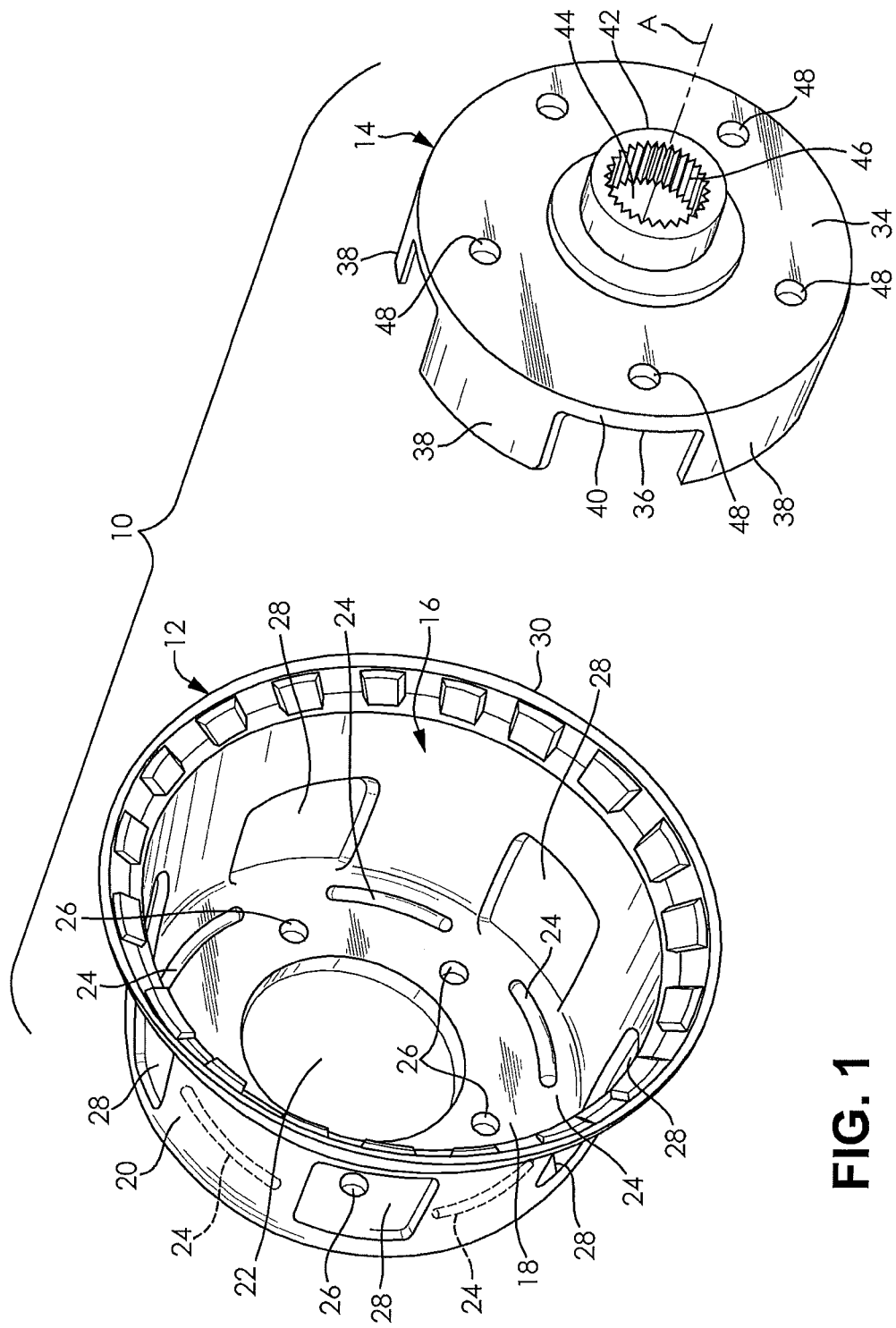
FIG. 1 is an exploded perspective view of a pinion carrier and drive shell assembly in accordance with the present invention.
Figure 2:
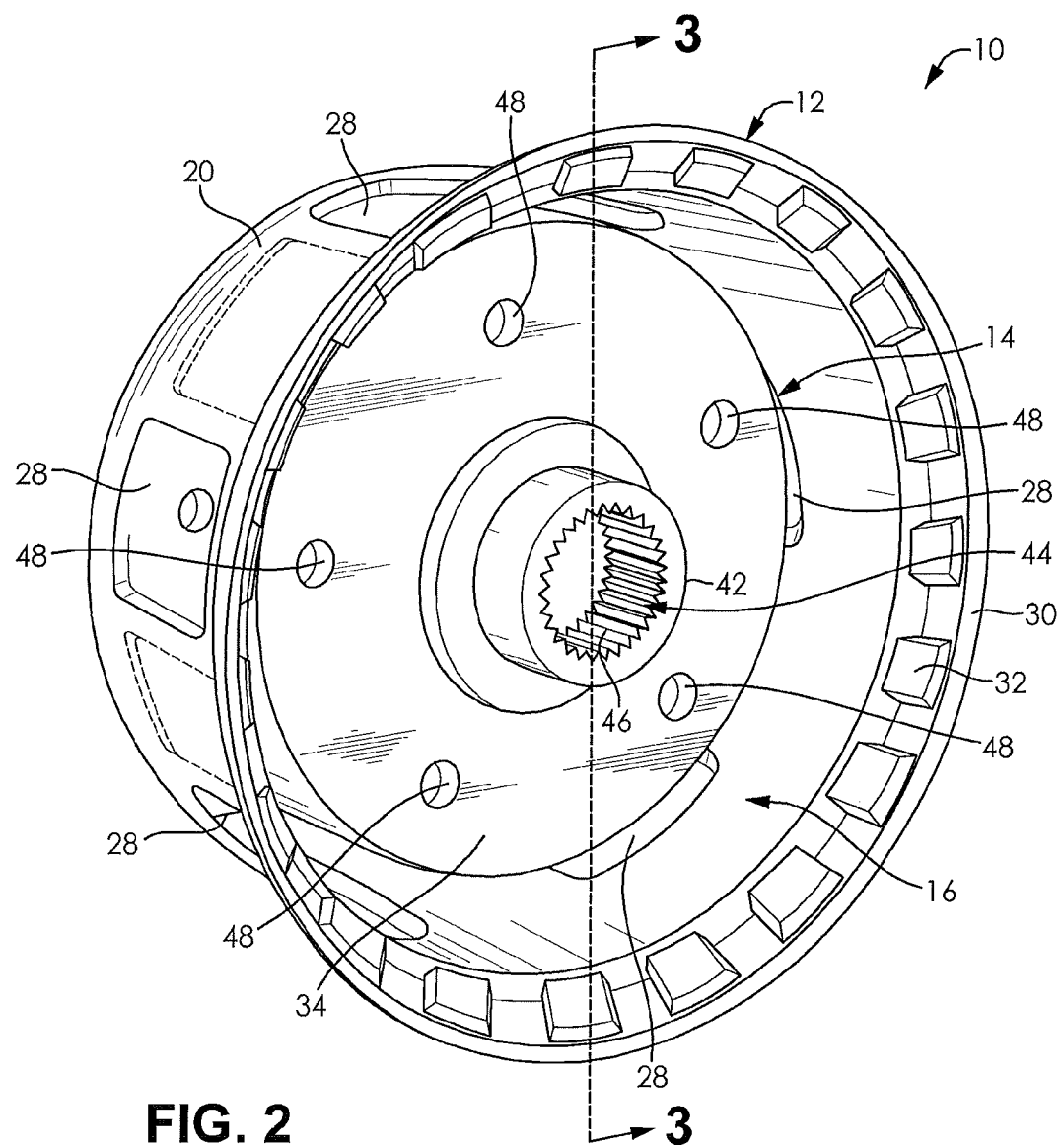
FIG. 2 is a perspective view of the pinion carrier and drive shell assembly of FIG. 1 shown assembled.

Referring now to the drawings, and particularly FIG. 1, there is shown generally at 10 an exploded perspective view of a pinion carrier and drive shell assembly or torque transmitting assembly (hereafter "assembly") incorporating the features of the invention. The assembly 10 includes a drive shell 12 and a pinion carrier 14.

Figure 3:
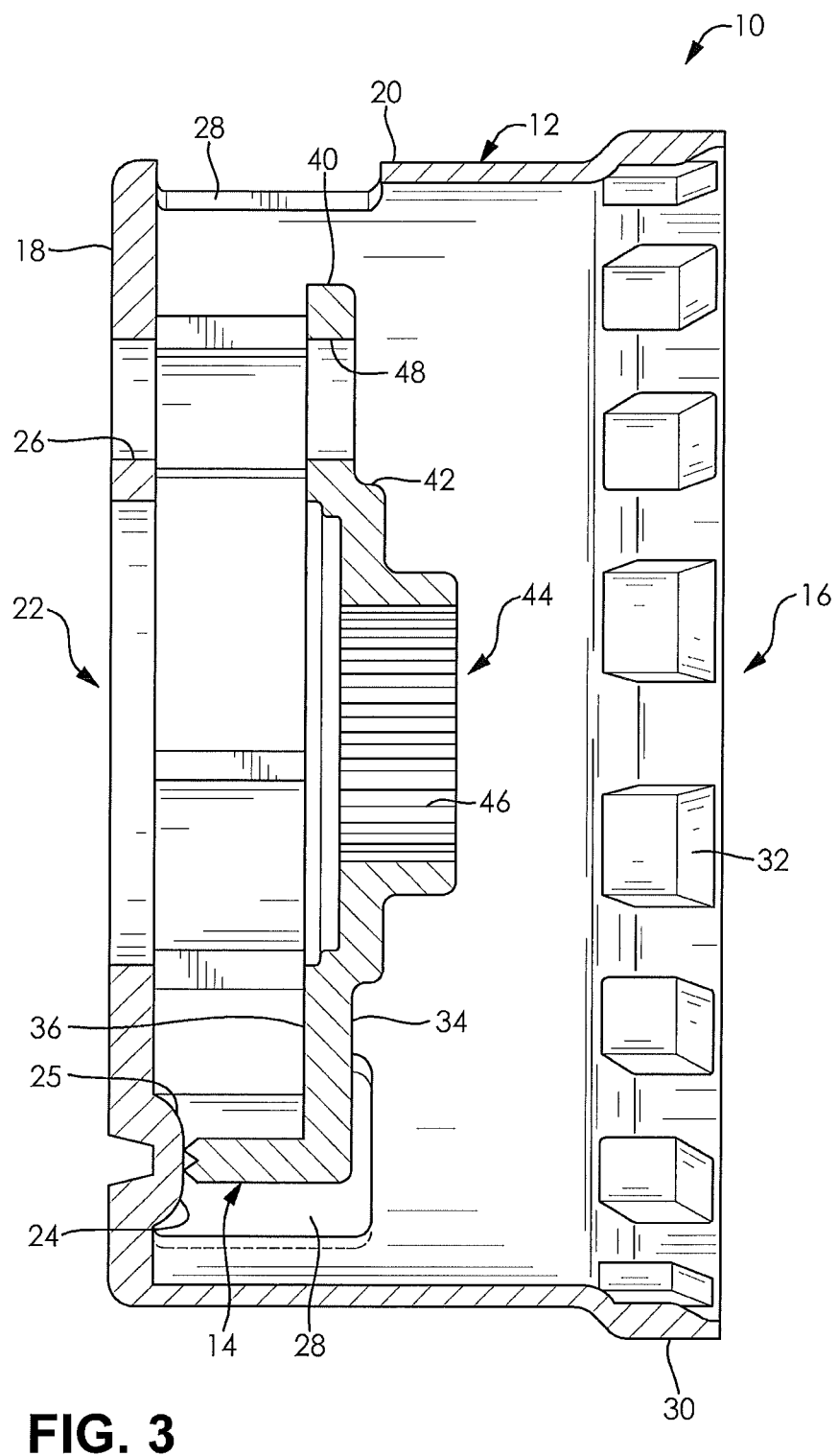
FIG. 3 is a section view of the pinion carrier and drive shell assembly of FIG. 2 taken along line 3-3.

The drive shell 12 is a generally cup shaped or bowl shaped outer shell having an open end 16, a closed end 18, and an outer wall 20. The closed end 18 of the drive shell 12 includes a central aperture 22 formed therein. An annular array of raised portions 24 is formed in the closed end 18 and surrounds the aperture 22. In the illustrated embodiment, each of the raised portions 24 has a generally arcuate contour that radially aligns with the annular shape of the outer wall 20. Alternatively, each of the raised portions 24 can have other desired contours. The raised portions 24 have an upper surface 25 as shown in FIG. 3. In the illustrated embodiment, the upper surfaces 25 are substantially flat. However, in other embodiments, the upper surfaces 25 can have other desired shapes, such as for example, crowned shapes. The raised portions 24 can be formed using conventional methods for semi-piercing the closed end 18 of the drive shell 12, such as the non-limiting examples of cold forming or stamping.

Referring again to FIG. 1, holes 26 are substantially interposed between adjacent raised portions 24 to form an annular array of the holes 26 around the aperture 22 of the closed end 18. A plurality of access holes 28 is formed in the outer wall 20 of the drive shell 12. In the embodiment shown, the access holes 28 are formed adjacent the holes 26 to provide access thereto and facilitate fabrication of the assembly 10.

An outwardly extending lip 30 surrounds the open end 16 of the drive shell 12. A plurality of splines or teeth 32 is formed on an inner surface of the lip 30.

Figure 4A:
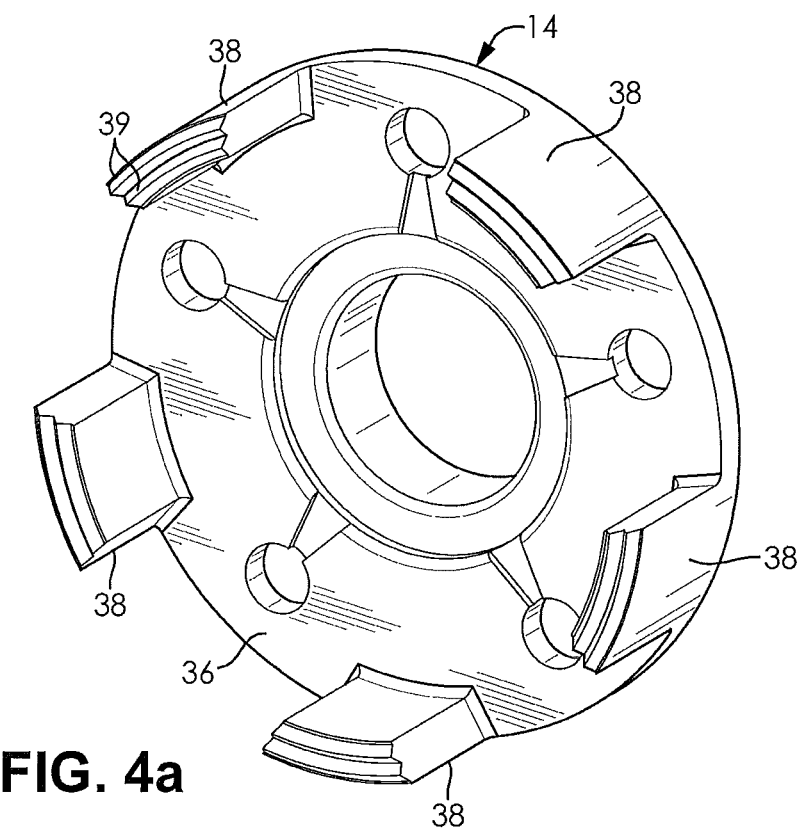
FIG. 4a is a perspective view of the pinion carrier of FIG. 1 illustrating projections extending from tabs.

The pinion carrier 14 is a generally disk shaped inner member with a central rotational axis A, a first side 34, and a second side 36. A plurality of tabs 38 extends axially outwardly from the second side 36 adjacent an outer edge 40 of the pinion carrier 14. Referring now to FIG. 4a, each end of the tabs 38 has a plurality of projections 39 extending axially therefrom. The projections 39 will be discussed in more detail below.

Referring again to FIG. 1, a central collar 42 extends axially outwardly from the first side 34 of the pinion carrier 14 and has a central aperture 44 formed therein. An annular array of teeth 46 is formed on an inner surface of the central collar 42 and is adapted to receive an end of a shaft (not shown) therein, the shaft having teeth formed on an outer surface thereof. An annular array of holes 48 is formed in the pinion carrier 14 and is positioned to be aligned with the holes 26 formed in the closed end 16 of the drive shell 12.

Referring again to the embodiment shown in FIG. 4a, the projections 39 have a generally arcuate contour that corresponds to the arcuate contour of the raised portions 24 of the drive shell 12. In other embodiments, the projections 39 can have other desired contours corresponding to the contour of the raised portions 24. In the embodiment shown in FIG. 4a, the projections 39 extend substantially the length of the tabs 38. Alternatively, the projections 39 can extend less than the length of the tabs 38. In still other embodiments, the projections 39 can be formed from discontinuous sections.

Figure 4B:
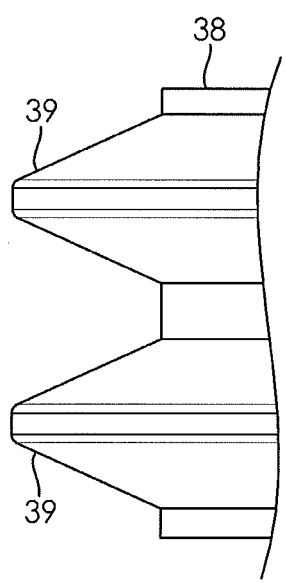

Referring now to FIG. 4b, each of the tabs 38 has a quantity of two projections 39 that combine to form a saw tooth cross-sectional pattern. As will be explained in more detail below, the saw tooth pattern is used to increase the strength of a weldment attaching the pinion carrier 14 to the drive shell 12. It should be appreciated that in other embodiments, more or less than two projections 39 can be used and the projections can form other desired cross-sectional patterns sufficient to increase the strength of the weldment.

Assembly of the assembly 10 is accomplished by providing the drive shell 12 and the pinion carrier 14 as shown and described. The tabs 38 of the pinion carrier 14 are aligned with the raised portions 24 of the drive shell 12. Once aligned, the projections 39 are brought into contact with the upper surfaces 25 of the raised portions 24. Bolts or rods (not shown) can be inserted through the holes 26 and the holes 48 to assist in alignment of the tabs 38 and the raised portions 24. The rods or bolts can be removed or left in as desired after assembly of the assembly 10 is complete. Once the projections 39 contact the upper surface 25 of the raised portions 24, the tabs 38 are welded to the raised portions 24 of the drive shell 12 to militate against separation of the drive shell 12 and the pinion carrier 14 when in use. Desirable results have been obtained using capacitance discharge welding to join the tabs 38 with the drive shell 12, however, it is understood that other welding and joining methods can be used. As discussed above, the saw tooth cross-sectional pattern formed by the projections 39 is configured to increase the strength of the weldment by increasing the area of the tab 38 being welded to the raised portion 24. Other cross-sectional patterns that increase the weldment area can be used without departing from the scope and spirit of the invention.

While the embodiment of the pinion carrier shown in FIGS. 1-3 and 4a show the tabs 38 as having a plurality of projections 39, it should be appreciated that in other embodiments the tabs can be formed without projections, i.e. the tabs can have surfaces devoid of projections without departing from the scope and spirit of the invention.

Once assembled, the shaft having teeth formed on the outer surface thereon is inserted through the aperture 22 of the closed end 18 of the drive shell 12 and into the aperture 44 of the collar 42 to mate with the teeth 46 formed therein. A rotating member (not shown) is received adjacent the lip 30 to engage the splines 32 thereof. Thus, rotation of the shaft can be transferred to the rotating member, or from the rotating member to the shaft through the assembly 10. The assembly 10 is especially useful in a vehicle transmission, but it is understood that the assembly 10 can be used in other applications as well.

The drive shell 12 and the pinion carrier 14 can be formed by any conventional production method such as stamping, cutting, drawing, cold forming, and flow forming, for example. Desirable results have been achieved by forming the drive shell 12 using a flow formed or cold formed method and forming the pinion carrier 14, often referred to as a "cup" or "pedestal", by cold forging or stamping. The use of flow forming, which is similar to cold forming, can concentrate the material where it is needed for strength. In addition, extremely long tubular sections can be produced, and are therefore well suited to creating the drive shell 12 of the assembly 10.

Several benefits are achieved by forming and assembling the drive shell 12 and the pinion carrier 14 using the methods described. First, an assembled joint is eliminated between the pinion carrier 14 and the drive shell 12 which typically includes a retaining ring and two mating splines. Second, cold work hardening of the drive shell 12 increases the strength thereof and thus, the mass of the drive shell 12 can be reduced compared to a stamped drive shell 12 at the same torque rating. Third, better alignment of critical portions of the pinion carrier and drive shell assembly 10 is experienced with minimized backlash between unnecessary spline joints while maximizing balance. Fourth, material thickness can be varied throughout the assembly 10 with thicker material where needed for locating the pinion shafts and resisting twisting of the planetary carrier portion and thinner material where permissible such as on the drive shell 12, for example. Fifth, the cost of the pinion carrier can be substantially reduced since the length of the tabs 38 can be shortened. Sixth, since the closed end 18 of the drive shell 12 is devoid of apertures other than the central aperture 22 and the holes 26, the closed end 18 is structurally more solid, thereby providing more strength to the assembly 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A torque transmitting assembly comprising:
a generally cup shaped outer shell having a closed end, an outer wall, and an open end, the closed end having at least one raised portion formed therein independent of the outer wall, the outer wall extending from the closed end to an outwardly extending lip surrounding the open end of the outer shell, the open end of the outer shell adapted to be operatively engaged with a first rotating member; and
a generally disk shaped inner member having a central aperture and a central axis, the inner member including at least one tab extending axially outwardly therefrom, the at least one tab including a first end having at least one projection extending axially therefrom and engaging the at least one raised portion of the outer shell to facilitate a transfer of rotation between the outer shell and the inner member, the central aperture adapted to be operatively engaged with a second rotating member, wherein the inner member is received inside the outer shell.

2. The assembly according to claim 1, wherein the outer shell is a drive shell.

3. The assembly according to claim 1, wherein the inner member is a pinion carrier.

4. The assembly according to claim 1, wherein the tab of the inner member is welded to the closed end of the outer shell.

5. The assembly according to claim 1, wherein the inner member includes a central collar surrounding the central aperture of the inner member and extending axially outwardly in a direction opposite the tab.

6. The assembly according to claim 5, wherein an annular array of teeth is formed on an inner surface of the collar.

7. The assembly according to claim 1, wherein the outer shell includes a plurality of splines formed on an inner surface of the lip to engage the first rotating member.

8. The assembly according to claim 1, wherein the first end of the at least one tab includes a plurality of the projections extending axially therefrom to form a saw tooth cross-sectional pattern at the first end of the at least one tab.

9. The assembly according to claim 8, wherein the plurality of the projections engages a substantially flat surface of the at least one raised portion, the plurality of the projections including a first projection and a second projection, wherein an opening is formed between the first end of the at least one tab and the flat surface of the at least one raised portion, the opening defined by a cooperation of the first projection, the second projection, and the flat surface.

10. A torque transmitting assembly comprising:
a drive shell having a closed end, an outer wall, and an open end, the closed end having a plurality of raised portions formed thereon independent of the outer wall, the outer wall extending from the closed end to an outwardly extending lip surrounding the open end of the drive shell, the open end of the drive shell adapted to be operatively engaged with a first rotating member; and
a pinion carrier having a central aperture and a central axis, the pinion carrier including a plurality of tabs extending axially outwardly therefrom, wherein each of the tabs including a first end having at least one projection extending axially therefrom and engaging one of the raised portions of the drive shell to facilitate a transfer of rotation between the drive shell and the pinion carrier, the central aperture adapted to be operatively engaged with a second rotating member.

11. The assembly according to claim 10, wherein the tabs of the pinion carrier are welded to the closed end of the drive shell.

12. The assembly according to claim 10, wherein the tabs of the pinion carrier are laser welded to the closed end of the drive shell.

13. The assembly according to claim 10, wherein the pinion carrier includes a central collar surrounding the central aperture of the pinion carrier and extending axially outwardly in a direction opposite the tabs.

14. The assembly according to claim 13, wherein an annular array of teeth is formed on an inner surface of the central collar.

15. The assembly according to claim 10, wherein the drive shell includes a plurality of splines formed on an inner surface of the lip to engage the first rotating member.

16. A method of producing a pinion carrier and drive shell assembly, the method comprising the steps of:
 providing a drive shell having a closed end, an outer wall, and an open end, the closed end having a plurality of raised portions formed therein independent of the outer wall, the outer wall extending from the closed end to an outwardly extending lip surrounding the open end of the drive shell, the open end of the drive shell adapted to be operatively engaged with a first rotating member;
 providing a pinion carrier having a central aperture and a central axis, the pinion carrier including a plurality of tabs extending axially outwardly therefrom, wherein each of the tabs including a first end having at least one projection extending axially therefrom, the central aperture adapted to be operatively engaged with a second rotating member;
 inserting the pinion carrier into the drive shell; and
 attaching the first end of each of the tabs of the pinion carrier to one of the raised portions of the drive shell to facilitate a transfer of rotation between the drive shell and the pinion carrier.

17. The method according to claim 16, including the step of welding the first end of each of the tabs of the pinion carrier to the closed end of the drive shell.

18. The method according to claim 16, including the step of laser welding the first end of each of the tabs of the pinion carrier to the closed end of the drive shell.

19. The method according to claim 16, including the step of producing the drive shell by cold forming.

20. The method according to claim 16, including the step of producing the drive shell by flow forming.

\* \* \* \* \*